United States Patent [19]

Brown

[11] Patent Number: 5,247,973

[45] Date of Patent: Sep. 28, 1993

[54] MARINE VESSEL WATER TANK FILLER

[76] Inventor: Dale Brown, P.O. Box 11721, Bainbridge Island, Wash. 98110

[21] Appl. No.: 848,273

[22] Filed: Mar. 9, 1992

[51] Int. Cl.$^5$ ............................ B65B 1/30; B65B 1/48
[52] U.S. Cl. ..................... 141/83; 141/198; 141/13; 141/126; 114/343; 222/64; 137/392; 137/588; 137/592
[58] Field of Search ................... 141/13, 21, 116, 126, 141/198, 83, 382, 86, 88, 95, 285, 301, 309; 114/343; 222/64; 137/392, 412, 588, 592

[56] References Cited

U.S. PATENT DOCUMENTS

| | | | |
|---|---|---|---|
| 3,616,824 | 11/1971 | Orlando | 141/198 |
| 3,872,899 | 3/1975 | Knight | 141/198 |

Primary Examiner—Henry J. Recla
Assistant Examiner—Steven O. Douglas
Attorney, Agent, or Firm—Harry M. Cross, Jr.

[57] ABSTRACT

Apparatus for controlling water supplied to a storage tank which comprises housing means for transferring water from a pressurized supply to a storage tank and having an extended portion adapted to water-tightly attach to an opening in a storage tank, a solenoid-operated on-off valve positioned with-in said housing and having a water inlet and a water outlet, electronic control means positioned with-in said housing and operatively-connected to said valve to control the opening and closing thereof, water inlet means mounted on said housing in fluid communication with said valve water inlet, water outlet means mounted in the extended portion of said housing in fluid communication with the valve water outlet; the extended portion of said housing means having a plurality of apertures therein to provide fluid communication between the interior and exterior of the housing extended portion, the apertures being positioned and arranged with respect to said water outlet means whereby pressurized water may enter a storage tank by passing through said valve and through said water outlet means without encountering said apertures, and whereby excess water at ambient pressure may exit a storage tank by passing through the housing extended portion, around said water outlet means and out through said apertures, so as to avoid subjecting the storage tank to the pressure of the incoming pressurized water.

6 Claims, 4 Drawing Sheets

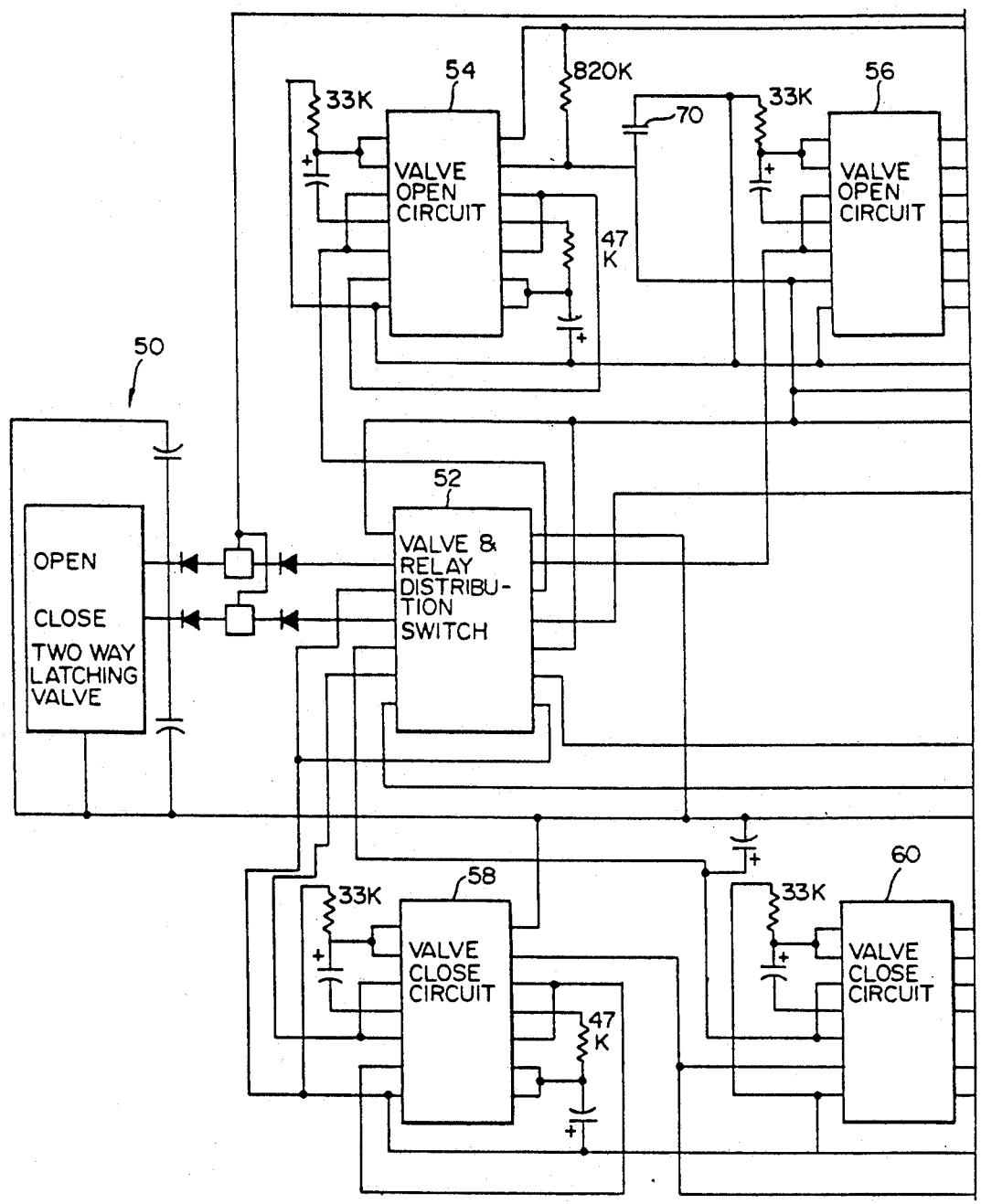

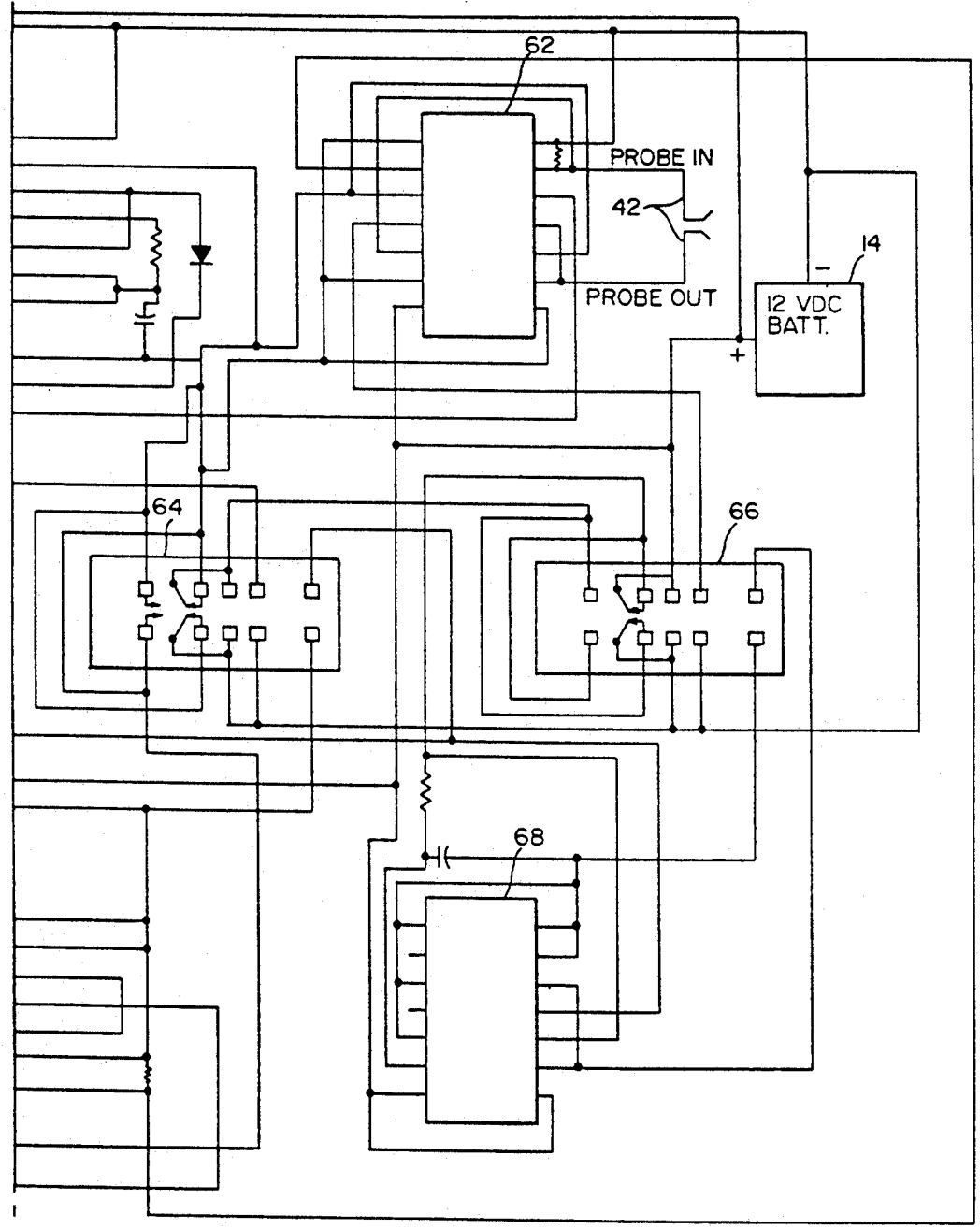

MARINE VESSEL WATER TANK FILLER

FIELD OF THE INVENTION

This invention relates to devices for filling on-board marine pleasure vessel water tanks from an external water supply system.

BACKGROUND OF THE INVENTION

In the general area of recreational vehicle, particularly marine pleasure vessels, on-board water storage tanks are commonly used to provide water for use within the vehicle. The internal water supply systems commonly used in such vehicles are low pressure systems that rely on low pressure pumps to distribute water from atmospheric-pressure water storage tanks. Vehicles such as pleasure boats may be moored for extended periods of time and it is a necessity that means are provided for refilling on-board water storage tanks from an external source, such as a public water supply system.

Usually, in the case of a moored pleasure boat, a garden-type hose is connected to a dockside water tap and water, at a relatively high supply pressure, is directed into an on-board tank through a deck-mounted filler tube. When the tank is filled, the supply water tap is simply turned off. If the boat is moored for extended periods of time while being occupied, the repeated refilling required become tedious and are often ignored until the on-board tank runs dry at some inopportune time. However, because the typical pleasure boat plumbing system is not designed to withstand the pressures of external water supply systems, it is not safe to leave the supply hose connected and the water supply turned on continuously. Obviously, an on-board leak in the plumbing system could have disastrous consequences and is to be avoided regardless of the inconvenience of having to manually refill the water tank periodically.

Some automatic water refilling systems have been proposed. These, however, require that the on-board plumbing system be modified to accommodate a relatively high pressure, constant source of external water. There are inherent safety problems in such by-pass plumbing systems and many boaters are unwilling to risk the chance that one of the internal fittings might rupture due to being exposed to constant "city" water pressure. A break in any such fitting, or a failure in an on-board control valve that would direct that water pressure to unsuited parts of the plumbing, could cause the boat to sink. Therefore, prudent boaters must still take care to turn the external water supply completely off for safety's sake when leaving their boat.

SUMMARY OF THE INVENTION

The present invention provides an automatic water supply device that can be mounted in the typical deck-mounted water filler tube of an on-board water storage tank for a pleasure boat. The device is designed to be connected to an external source of pressurized water, such as a "city" water supply by means of a garden-type hose. The device automatically supplies atmospheric-pressure water into the on-board storage tank. In the event that the device should mal-function and continuously feed water into a filled tank, the device will permit water to overflow through it to the outside surroundings so that the tank is never subjected to above-atmospheric pressures.

Most pleasure boat water storage tanks have filler tube deck fittings. The device of this invention is designed to screw into the typical deck fitting. A standard garden-type hose may be used to connect the device to an external water supply, such as "city" water. When the "city" water is turned on, the device controls the tank filling on a timed basis. The device automatically detects when the tank is filled and blocks further supply of water from the external source. The device itself, except for a water tank inlet tube and a water level sensor, sets above the deck, externally to the boat. If, for any reason, the device does not block water supply from the external source when the tank becomes full, excess water will run out through the tank's deck-mounted fitting, at atmospheric pressure, into the device and then be discharged from the device above the deck, externally to the boat.

The device of this invention will provide a constant supply or water regardless of the tank capacity or amount of use. Thus, the boater gets the advantage of a direct hook-up to "city" water without having to install a costly dual plumbing system and without having to risk the danger of a burst pipe or fitting causing the boat to sink. And, as stated above, if the device of this invention should malfunction and stick in the "open" position, the excess water would simply pour over the side of the boat after the tank reached its filled capacity; the outboard location of the tank filler fitting, through which the device operates, providing this added safety feature.

The device of this invention is preferably battery-operated and includes an integrated circuit controller and a latching-type solenoid water supply valve. The latching valve requires electricity only for a few microseconds which opening or closing. The integrated circuit controller, while on at all times, draws only a few milliamperes. As a result, the device of this invention functions easily on a self-contained battery system. For convenience, it would be possible to wire the device into the boat's 12 volt DC electrical system.

BRIEF DESCRIPTION OF THE DRAWINGS

FIG. 6A and 6B is a circuit diagram for an exemplary electronic controller associated with the device of this invention.

DETAILED DESCRIPTION OF THE INVENTION

Figure 1:
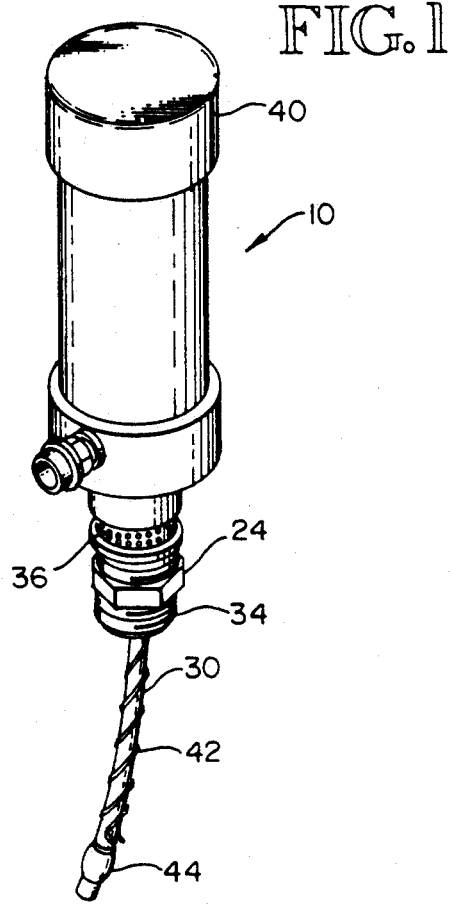
FIG. 1 is a perspective view of the device of this invention.
Figure 2:
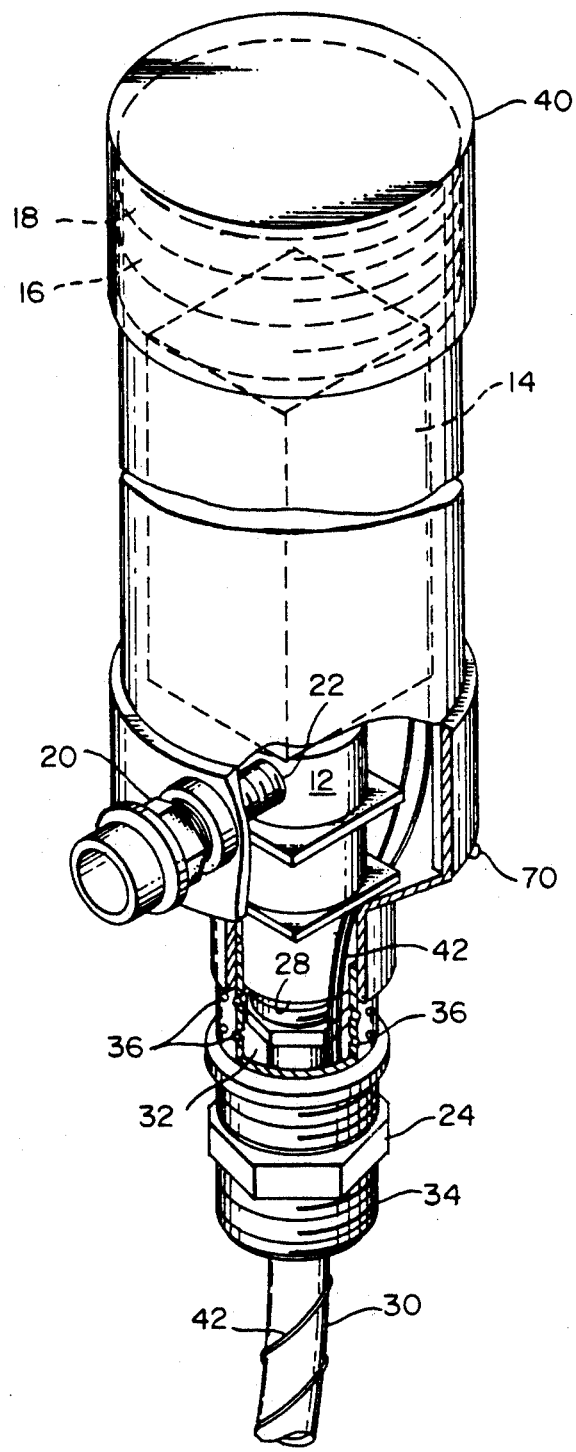
FIG. 2 is an enlarged perspective view of the device of this invention, in partial cross-section.
Figure 3:
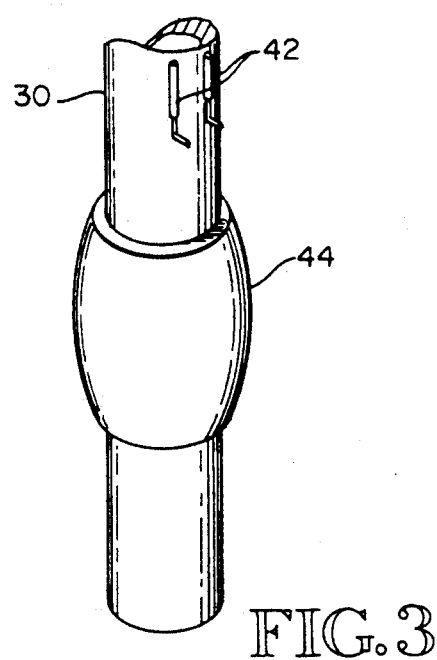
FIG. 3 is an enlarged detail view illustrating the water tank supply tube and water level detectors that extend from the device.
Figure 4:
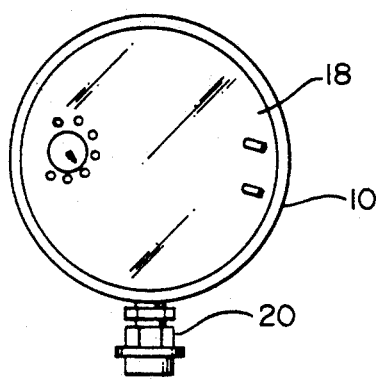
FIG. 4 is a top plan view of the FIG. 2 device, illustrating the control panel.
Figure 5:
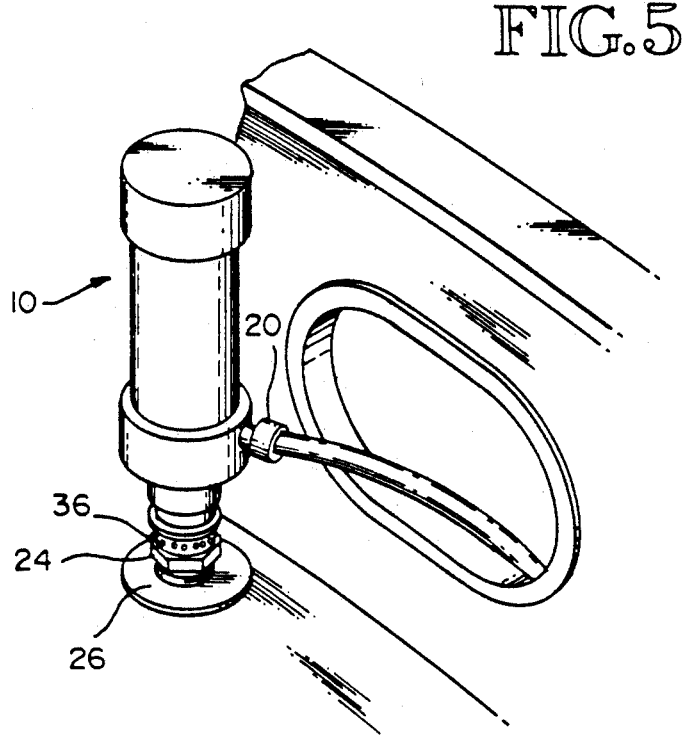
FIG. 5 is another perspective view of the invention installed in a deck-mounted on-board water tank filler tube fitting of a pleasure boat.

The automatic water tank filler of this invention comprises a housing 10 within which are located a solenoid-operated flow control valve 12, a battery 14, an electronic control circuit 16 and a control panel 18. The housing 10 is ported to receive and mount a female hose coupling 20 leading to the inlet port 22 of valve 12.

Housing 10 is also ported to provide a water tank coupling 24 for mounting in a water tank inlet fitting 26. The valve 12 is centered in housing 10 and is oriented such that its outlet port 28 opens axially into housing coupling 24. A water filler tube 30 is threadedly connected to the outlet port 28 of valve 12 and is extended through and beyond the housing coupling 24. Filler tube 30 has a smaller diameter than coupling 24 so that an annulus 32 is provided between the outer periphery of tube 30 and the interior of coupling 24. Coupling 24 is provided with a male-threaded fitting 34 for attachment to a female-threaded water tank inlet fitting 26. Coupling 24 is provided with a plurality of radial bores 36 that extend through the coupling wall, between the outlet port 28 of valve 12 and the coupling fitting 34 to provide for fluid communication between the annulus 32 and ambient surroundings. The valve 12 resides in the lower portion of housing 10, a 6 volt battery 14 is positioned above valve 12, a solid state electronic control circuit panel 16 is positioned above the battery 14 and the control panel 18 set above the control circuit, adjacent the top of the housing 10. Housing 10 is also provided with a threaded cap 40 that screws over the open upper end of the housing to close off the housing. A pair of wire electrodes 42 extend from the control circuit 16, down through the housing 10, between the housing and the battery 14 and the valve 12, and out through the annulus 32 in the coupling 24 alongside the filler tube 30. The exposed portions of the electrode wire pair 42 are appropriately secured to the exterior of the filler tube 30 as by bands of tape. The electrode wire pair 42 terminates near the outer end of the filler tube 30; the ends of the wires being turned radially outward and exposed. Between the outermost end of the filler tube 30 and the terminus of the wire pair 42, a bulbous bumper 44 is provided around the periphery of filler tube to protect the ends of the wire pair.

The control circuit 16 is designed such that the valve 12 is latched to the closed position to prevent water from passing through the filler tube 3 when both exposed ends of the electrode wire pair 42 are submerged in water within the water tank. Therefore, filler tube 30 and the wire pair 42 secured thereto must be long enough to be able to extend into a water tank far enough to locate the wire pair ends at the desired "full" level within the tank. When the control circuit is enabled (the tank water level being low enough to expose the wire pair ends) the control circuit may, under appropriate programming, cause the valve 12 to be latched to the open position to permit water to pass through the valve and through the filler tube into the water tank. An external supply of water would be connected through a garden-type hose that would be coupled to the inlet coupling 20. The external supply could be turned on and left on to provide a continuous supply of external water to the valve inlet 22.

Whenever water is to be transferred to the water tank, the valve 12 is electronically activated to latch open and the external supply of water is then automatically transferred into the water tank. When the tank reaches a "full" condition, the electrode wire pair ends are submerged by the rising water within the tank, completing a "turn-off" loop within the control circuit 16, and causing the valve 12 to be latched to the closed condition. If, for any reason, the valve 12 remains in the latched "open" condition, even though the water tank becomes filled, any excess water will overflow upward around the filler tube 30 and pass into the annulus 32 of the coupling 24 and be vented out through the apertures 36 to the ambient surroundings. Because annulus 32 communicates with the air space above the water within the water tank, the water tank will not experience over-ambient water pressures, even during an overfilling condition as just described. Because the device of this invention is designed to be mounted to the deck fitting of a marine vessel's water storage tank, water expelled through the coupling apertures 36 will simply spill onto the vessel deck surface and drain harmlessly away.

An exemplary control circuit 16 is shown for controlling the latching valve 12. A suitable latching valve is a series 20, Emmco 2-way latching valve that is designed to remain unenergized in tow stable operation positions. The solenoid plunger changes positions by means of a permanent magnet controlled by a momentary current pulse. The only power consumption is during the period of changing plunger positions (a few milliseconds). In circuit 16, the latching valve is indicated at 50, the CMOS integrated control circuits at 52 (for valve and relay distribution), 54 (for "valve open" circuit to reset relay to valve close circuit), 56 (for "valve open" circuit to open valve after a pre-set time delay), 58 (for "valve close" circuit to set relay to valve open circuit), 60 (for "valve close" circuit to close valve at instant of submersion of water probe ends of wire pair 42), 62 (for water sensing and shut off of switches for "valve open" and "valve close" circuits, and 68 (time delay circuit to reset main relay); the high water probe is indicated at 42; a circuit-dividing relay at 64; a main relay at 66; and a rechargeable 12 volt battery at 14. A momentary switch button 70 is provided to permit overriding the control circuit such that the valve 12 may be actuated to fill the water tank, out of any timed preprogrammed sequence; when the wire ends of the water probe 42 are exposed, of course. The circuit may be preset to trigger itself "on" once per day; of a timer may be added to enable it to be programmed to be triggered "on" as desired, over a one week cycle for example.

As described, the device of this invention is completely self-contained. The housing 10 carries the entire unit so that it need only be screwed into the deck-mounted water tank fitting and attached to an external water supply to be operative. No external or auxiliary plumbing or wiring is required. The device, when attached to the deck fitting, will automatically vent itself so that excess water may automatically escape in the event that a valve failure leads to overfilling. The device is foolproof and failsafe.

While the preferred embodiment of the invention has been described herein, variations in the design may be made. The scope of the invention, therefore, is only to be limited by the claims appended hereto.

The embodiments of the invention in which an exclusive property is claimed are defined as follows:

I claim:

1. Apparatus for controlling water supply to a storage tank which comprises housing means for transferring water from a pressurized supply to a storage tank and having an extended portion adapted to water-tightly attach to an opening in a storage tank, a solenoid-operated on-off valve positioned within said housing and having a water inlet and a water outlet, electronic control means positioned within said housing and operatively-connected to said valve to control the opening and closing thereof, water inlet means mounted on said housing in fluid communication with the valve water inlet, water outlet means mounted in the extended portion of said housing in fluid communication with the valve water outlet; the extended portion of said housing means having a plurality of apertures therein to provide fluid communication between the interior and exterior of the housing extended portion, the apertures being positioned and arranged with respect to said water outlet means, whereby pressurized water may enter a storage tank by passing though said valve and through said water outlet means without encountering said apertures, and whereby excess water at ambient pressure may exit a storage tank by passing through the housing extended portion, around said water outlet means and out through said apertures, so as to avoid subjecting the storage tank to the pressure of the incoming pressurized water.

2. The apparatus of claim 1 wherein said water outlet means comprises a connector and an elongated flexible filler tube having an outer end said connector connecting the filler tube to the valve water outlet, and said filler tube outer end extending through and beyond the housing extended portion whereby, when said housing is attached to a storage tank, said filler tube will extend into the storage tank beyond the point of attachment of said housing with the storage tank.

3. The apparatus of claim 2 including water level sensor means, comprising extremities, extended from said control means, through said housing and through the housing extended portion alongside said filler tube, the extremities of said sensor means terminating near the outer end of said filler tube and being arranged in relation to said filler tube, whereby, water filling the storage tank will contact the extremities of said sensor means before the water level in the tank reaches the point of attachment of said housing with the storage tank.

4. The apparatus of claim 3 wherein said extremities comprises a pair of elongated electrodes extending alongside said filler tube and terminating above the outer end of said filler tube, the elongated electrodes being exposed to ambient conditions and located adjacent the outer surface of said filler tube, whereby, the exposed electrodes may be contacted by water within the storage tank during a filling operation.

5. The apparatus of claim 4 wherein said filler tube includes an enlarged portion adjacent the electrodes, said enlarged portion having a configuration such that it projects beyond the electrodes to protect the electrodes from contacting their surroundings when inserted into the storage tank.

6. Apparatus for controlling water supply to a storage tank which comprises housing means having an interior and exterior portion for transferring water from a pressurized supply to a storage tank and having an extended portion adapted to water-tightly attach to an opening in a storage tank, a solenoid-operated on-off valve positioned within said housing and having a water inlet and a water outlet, electronic control means positioned within said housing and operatively-connected to said valve to control the opening and closing thereof, water inlet means mounted by said housing in fluid communication with the valve water inlet, water outlet means mounted in the extended portion of said housing in fluid communication with the valve water outlet; the extended portion of said housing means having a plurality of apertures therein to provide fluid communication between the interior and exterior of the housing extended portion, the apertures being positioned and arranged with respect to said water outlet means whereby pressurized water may enter a storage tank by passing though said valve and through said water outlet means without encountering said apertures, and whereby excess water at ambient pressure may exit a storage tank by passing through the housing extended portion, around said water outlet means and out through said apertures, so as to avoid subjecting the storage tank to the pressure of the incoming pressurized water;

- water outlet means comprising a connector and an elongated flexible filler tube having an outer end, said connector connecting the filler tube to the valve water outlet, and said filler tube outer end extending through and beyond the housing extended portion whereby, when said housing is attached to a storage tank, said filler tube will extend into the storage tank beyond the point of attachment of said housing with the storage tank;
- level sensor means having extremities extended from said control means, through said housing and through the housing extended portion alongside said filler tube, the extremities, of said sensor means terminating near the outer end of said filler tube and being arranged in relation to said filler tube whereby water filling the storage tank will contact the extremities of said sensor means before the water level in the tank reaches the point of attachment of said housing with the storage tank;
- said extremities comprising a pair of elongated electrodes extending alongside said filler tube and terminating above the outer end of said filler tube, the elongated electrodes being exposed to ambient conditions and located adjacent the outer surface of said filler tube whereby the exposed extremities be contacted by water within the storage tank during a filling operation; and
- said filler tube including an enlarged portion adjacent the electrodes, said enlarged portion having a configuration such that it projects beyond the electrodes to protect the electrodes from contacting their surroundings when inserted into the storage tank.

* * * * *